UNITED STATES PATENT OFFICE.

KARL AHLQUIST, OF RUGBY, ENGLAND, ASSIGNOR TO GENERAL ELECTRIC COMPANY, A CORPORATION OF NEW YORK.

SHAFT-PACKING FOR ELASTIC-FLUID TURBINES.

No. 922,551.     Specification of Letters Patent.     Patented May 25, 1909.

Application filed October 31, 1907. Serial No. 399,997.

*To all whom it may concern:*

Be it known that I, KARL AHLQUIST, a subject of the King of Sweden, residing at Sunnyside, Clifton Road, Rugby, England, have invented certain new and useful Improvements in Shaft-Packings for Elastic-Fluid Turbines, of which the following is a specification.

The present invention relates to shaft packings, and more especially to those employed in elastic-fluid turbines to prevent leakage of motive fluid from one stage compartment to another, or to prevent leakage around the shaft where it passes through a wall of the wheel casing.

The object of my invention is to provide a packing of improved construction wherein the leakage is reduced to a minimum, and this without excessive rubbing between the parts.

My invention comprises a form of packing in which the surfaces of the joint extend perpendicular to the shaft or substantially so, and in which a layer of leakage steam is practically always present between the rubbing surfaces thereby providing lubrication which reduces the friction and consequent wear to a minimum.

Figure 1:
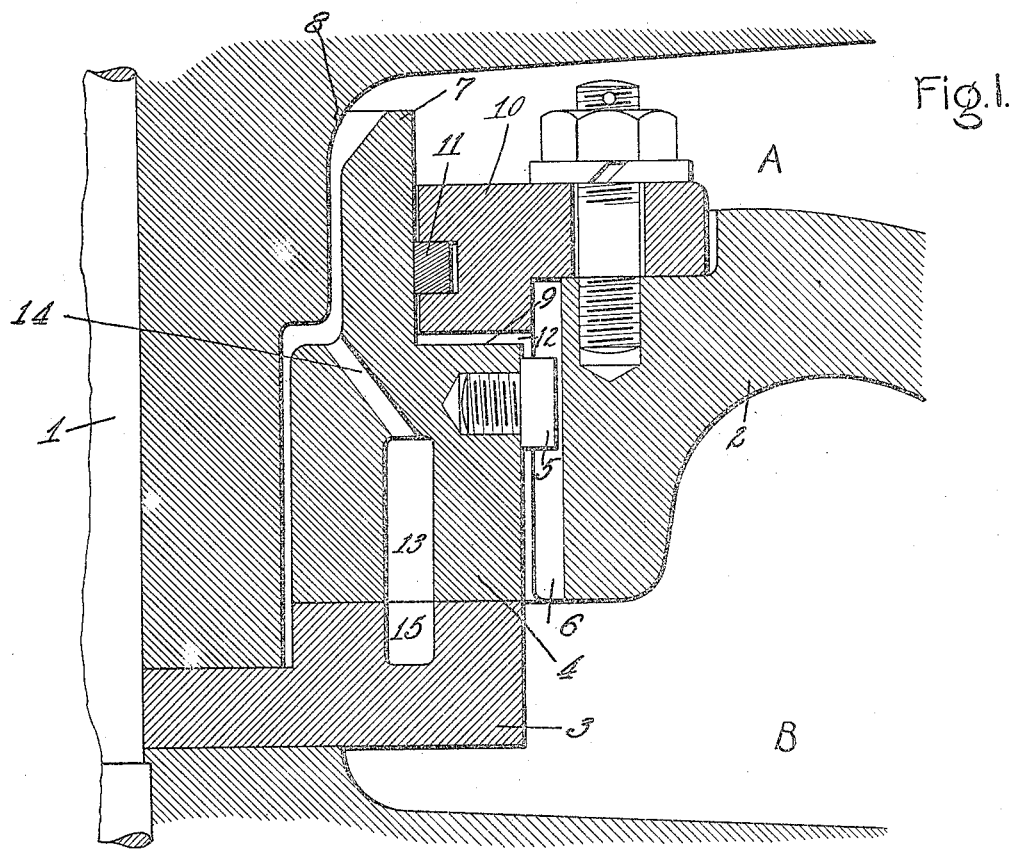
Figures 2, 3:
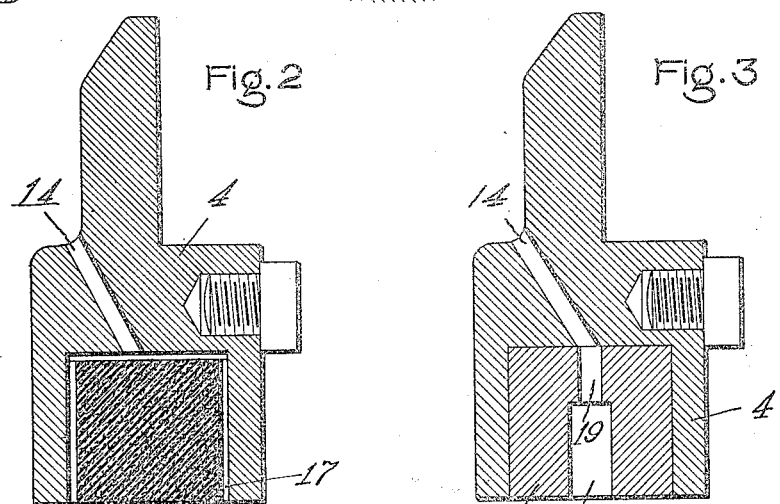

In the accompanying drawing, which illustrates one of the embodiments of my invention, Figure 1 shows a packing as applied to the diaphragm between the stages of a vertical shaft elastic fluid turbine; Figs. 2 and 3 show modifications of my invention.

In carrying my invention into effect as illustrated in Fig. 1 of the drawing, I secure on the shaft 1 of the turbine adjacent to the shaft-opening in the diaphragm 2 a disk 3 on which is supported a coöperating annulus 4 which is prevented from rotating by projections such as the set screws 5 fitting into grooves 6 in the wall of the diaphragm opening, these grooves 6 however are formed so as to allow vertical movement of the disk 3 relatively to the shaft and diaphragm.

The annulus has an upward extension 7 which fits with easy clearance the hub 8 of the bucket wheel so as to allow for lateral vibration of the shaft and to allow steam from the higher pressure stage to surround the hub of the bucket wheel. The extension is cut away from the periphery of the bearing ring to form a shoulder 9 above which is located a ring 10 capable of axial adjustment and carried by the diaphragm. Between the upward extension 7 and the ring 10 is located a piston ring 11 carried by the latter for the purpose of preventing excessive leakage through the joint thus formed but at the same time allowing the annulus to move easily in an axial direction. A clearance space 12 between the shoulder 9 and the under side of the ring 10 is occupied by steam at the lower stage pressure.

The annulus 4 is provided in its under side with an annular recess or groove 13 extending upwardly to a suitable height and is in communication with the high pressure steam in the clearance space between the annulus and wheel hub by means of a number of passages 14. Immediately below this annular recess may be arranged a similar corresponding groove 15 in the disk 3, the two recesses forming a chamber to which the higher stage steam always has access through the passages 14. The annulus 4 prevented from rotational movement by means of the set screws engaging the stationary diaphragm, forms a bearing surface with the disk 3 but this bearing surface is divided into two annular surfaces by the grooves or recesses 13 and 15.

The steam pressure from stage A acting upon the upwardly extending flange 7 and adjacent parts of the annulus in conjunction with the lower pressure of stage B acting upon the shoulder 9 tends to force the annulus down on to the disk 3. This pressure is however balanced by the high pressure steam leaking through the joint, that is to say, the leakage over the inner bearing surface from stage A into the grooves or recesses 13 and 15. The bearing surface exposed to higher pressure is proportioned with relation to the other bearing surfaces so that the annulus is just lifted off the disk thus leaving a very small clearance occupied by a film of steam. The pressure in the chamber formed within the disk and annulus adjusts itself to a value intermediate that of the high and low pressure stages but usually nearer that of the high pressure stage.

Should the clearance between the annulus and the disk at any time become greater than normal then more steam will leak out of the annular chamber or groove into the lower pressure stage than can enter from the higher pressure stage through the clearance between the shaft and annulus 4 and through the passages 14. Consequently, since the chamber pressure normally exceeds the average pressure of the two stages, it follows that the latter will be lowered thus reducing the upwardly acting effect upon the annulus. On the other hand, the pressure from the high and low stages acting on the upper surfaces of the annulus and in the opposite direction remains constant for a given condition and thereby returns the annulus, which virtually floats, to its normal or balanced position. Should the clearance between the annulus and disk be reduced below normal, the leakage from stage A through the holes into the chamber raises the pressure therein and this pressure acting on the under side of the annulus restores the same to its balanced position. By this arrangement it will be readily understood that the leakage of steam from stage A to stage B may be adjusted and the annulus kept floating. Moreover provision is made for considerable wear between the parts in the event of their occasionally touching.

In the modified form of my invention illustrated in Fig. 2, the annular recess in the underside of the annulus 4 is made sufficiently large to house a ring of carbon or other material 16 which is so arranged as to have a clearance or steam space 17 surrounding it to fulfil the office of the chamber above referred to. This steam space communicates as before by means of holes or passages 14 with the stage A.

In Fig. 3 I have illustrated another form of packing in which the inserted carbon or other ring 16 may be a neat fit within the bearing ring 4 but recessed or grooved at 18 to form a steam chamber having inlet holes 19 in alinement with the holes 14 leading from the higher pressure stage.

Owing to the arrangement of parts it will be seen that the only wear which takes place is between the opposed surfaces of the disk 3 and annulus 4. Since the annulus is non-rotatable the slight wear between it and the packing ring 11, due to vertical movements, can be disregarded. Since these parts are all comparatively small and are removable it costs very little to replace them in event of injury. The leakage steam through the joint between the disk and annulus has been found in practice to be sufficient to fully lubricate the surfaces, while the total amount of steam escaping from one stage to the next is reduced to a very small amount.

It is evident that since the annulus does not rotate that only one end of it has to be finished and therefore only one seat, the disk 3, is necessary. This means that the bucket wheels do not have to be especially finished nor do they have to be located on the shaft with any special reference to the packing. Their position is determined by that of the nozzles and by the nozzles and intermediate buckets where such buckets are used. It will thus be seen that I avoid the severe requirements as to adjustment which would be occasioned if both ends of the annulus had to bear an exact definite relation to the wheels or to parts moving with the wheels.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a shaft packing, the combination of a disk rotating with the shaft, an annulus one end of which is presented to the disk, a means preventing the annulus from rotating but permitting axial movement, a chamber between the disk and annulus and communicating with the joint between them, and a passage receiving fluid directly from the high pressure side of the packing and conveying it to the chamber to cause axial adjustment of the annulus.

2. In a shaft packing, the combination of a disk rotating with the shaft, an annulus directly acted upon by the pressures on opposite sides of the packing which coöperate to move it axially in one direction, a chamber located between the disk and annulus, the said chamber being in constant communication with the joint between the disk and annulus, and passages for directly supplying the chamber with an amount of fluid to maintain a pressure therein intermediate those on opposite sides of the packing, the said fluid pressure normally acting to maintain a slight separation between the disk and annulus.

3. In a shaft packing, the combination of a disk rotating with the shaft, an annulus, means preventing the annulus from rotating but permitting it to move axially under changes in fluid pressure, a ring coöperating with the annulus in such manner that the latter is exposed to the fluid pressures on opposite sides of the packings, which fluid pressures tend to move the annulus in one direction, a chamber containing fluid at a pressure intermediate those on opposite sides of the packing, the said chamber opening into the joint between the disk and annulus, and passages for supplying such an amount of fluid to the chamber as will maintain the intermediate pressure.

4. In a shaft packing, the combination of a disk rotating with the shaft, an annulus having a surface exposed to high pressure and a second surface exposed to low pressure, a stationary ring, a yielding means between the ring and annulus, means preventing the annulus from rotating but permitting it to move axially, a chamber between the disk and annulus which opens into the joint between them, and a passage supplying fluid thereto to maintain a pressure intermediate those on opposite sides of the packing to cause axial movement of the annulus.

5. In a shaft packing, the combination of a disk rotating with the shaft, an annulus, a means preventing the annulus from rotating but permitting axial movement, a chamber communicating with the joint between the disk and annulus, a passage conveying fluid from the high-pressure side of the packing to the chamber to cause axial adjustment of the annulus, and a ring located in the chamber to reduce leakage through the joint between the disk and annulus.

6. In combination, a shaft, a diaphragm through which the shaft passes, a disk rotating with the shaft, an annulus, a means carried by the annulus and engaging the diaphragm to prevent rotation but permitting axial movement thereof, a ring carried by the diaphragm and held against rotation, a packing between the ring and annulus, a chamber formed in the annulus and opening into the joint between it and the disk, and a passage admitting a restricted amount of high-pressure fluid to the chamber to maintain a pressure therein intermediate those on opposite sides of the packing.

7. In a shaft packing, the combination of a diaphragm having an opening through which the shaft passes, said diaphragm being subjected to different pressures on its opposite sides, a disk rotating with the shaft which is located on the low pressure side of the diaphragm, an annulus having one face closely adjacent one face of the disk and freely mounted for longitudinal movement in the shaft opening but held against rotation, there being a chamber formed in the adjacent faces of the annulus and disk and passages connecting said chamber directly with the high pressure side of the diaphragm, an extension on the high pressure side of the annulus which is of less diameter than the main portion of the annulus, and a packing ring mounted on the high pressure side of the diaphragm which engages the lateral surface of said extension and prevents the high pressure from acting on the outer surfaces of the main portion of said annulus.

In witness whereof, I have hereunto set my hand this second day of October, 1907.

KARL AHLQUIST.

Witnesses:
  REGINALD FRANCIS HALLIWELL,
  C. G. SEELEY.